No Printed Specification Available
9172X
R. I. L. WITTY.
CONSTRUCTION OF BRIDGES.
Patented Oct. 14, 1835.
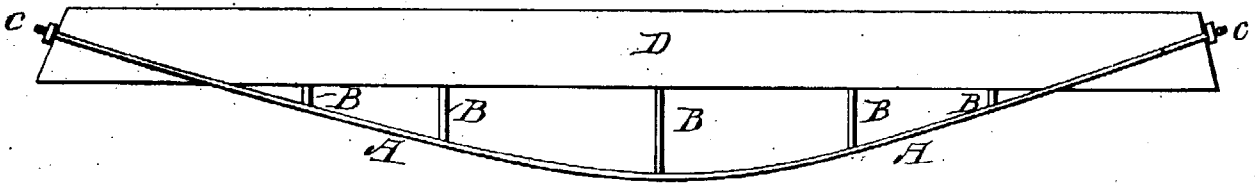
THE NORRIS PETERS CO., PHOTO-LITHO., WASHINGTON, D. C.

Oct. 14. 1835 9172X 89

Richard I. L. Witty. Lowell. and State of Massachusetts

The Schedule referred to in these Letters Patent and making part
of the same, containing a description in the words of the said Richd
I. L. Witty himself of his improvement in the construction of Bridges &c.

To all to whom these presents shall come. Be it known that I
Richard I. L. Witty of the Town of Lowell, in the County of Middlesex
and State of Massachusetts have invented a new and useful im-
provement in the construction of Bridges over Rivers and canals and
also for the forming of viaducts for Rail ways, Piers for Docks or
Harbours, and Public Buildings. And I do hereby describe the na-
ture of my said invention for such purposes. In order to produce a
a Bridge, I combine the lateral thrust or pressure of a Beam to the catenary
curve which said curve may be formed of rods of wrought iron or
other metal and of chain or rope &c. But I prefer rods of wrought
Iron. The curve of iron must be stretched from end to end of a
beam of wood, and firmly bolted thereto and passing over Stanchions
or other supports of wood or iron, fastened to the beam, which said
supports may be placed at suitable distances under the beam to
form the Catenarian curve, and the more firmly to retain it in its
place. By this arrangement a very considerable strength of beam may
be obtained for the making of Bridges over Rivers, Canals &c and for
the formation of Viaducts to to carry over Rail-ways in the construc-
tion of Piers for Docks or harbours and for Public Buildings, where consid-
-erable extent of Beam may be required and for other purposes —
What is claimed are the invention, improvements or
methods of making Beams sufficiently strong for the formation of Bridges
so as to extend them over Rivers of great width &c. and by heading
the said beams with iron Shields for that purpose, and to hold firmly
the iron Rods.

Witnesses
Thomas Johns
Henry Bishop

Richd I. L. Witty

Exd.
WHC

Patented 14th Oct. 1835.

(39 4/12 pages)

Drawings made